United States Patent
Qian et al.

(10) Patent No.: US 11,248,126 B2
(45) Date of Patent: Feb. 15, 2022

(54) AQUEOUS COATING COMPOSITION

(71) Applicants: Dow Global Technologies LLC, Midland, MI (US); Rohm and Haas Company, Collegeville, PA (US)

(72) Inventors: Zhen Qian, Anhui (CN); Yaguang Zhao, Shanghai (CN); Wei Cui, Shanghai (CN); Ling Li, Louyang (CN)

(73) Assignees: Dow Global Technologies, Midland (ML); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 16/976,176

(22) PCT Filed: Apr. 12, 2018

(86) PCT No.: PCT/CN2018/082746
§ 371 (c)(1),
(2) Date: Aug. 27, 2020

(87) PCT Pub. No.: WO2019/196044
PCT Pub. Date: Oct. 17, 2019

(65) Prior Publication Data
US 2021/0017396 A1    Jan. 21, 2021

(51) Int. Cl.
| C08F 212/08 | (2006.01) |
| C09D 125/14 | (2006.01) |
| C09D 5/02 | (2006.01) |
| C08F 220/18 | (2006.01) |
| C09D 133/08 | (2006.01) |

(52) U.S. Cl.
CPC ............ *C09D 5/022* (2013.01); *C08F 212/08* (2013.01); *C08F 220/1804* (2020.02); *C09D 125/14* (2013.01); *C09D 133/08* (2013.01)

(58) Field of Classification Search
CPC .... C09D 5/022; C09D 125/14; C09D 133/08; C08F 220/1804; C08F 212/08

USPC ........................................................ 524/147
See application file for complete search history.

(56) References Cited

U.S. PATENT DOCUMENTS

| 5,348,998 A | 9/1994 | Ito et al. |
| 6,359,092 B1 | 3/2002 | Harvey et al. |
| 7,745,567 B2 | 6/2010 | Carpenter et al. |
| 8,211,987 B2 | 7/2012 | Ahmadnian et al. |
| 9,199,902 B2 | 12/2015 | Ogasawara et al. |
| 9,388,323 B2 | 7/2016 | Zong et al. |
| 10,457,754 B2 * | 10/2019 | Ogasawara ............... C08F 2/24 |
| 2015/0073080 A1 | 3/2015 | Wu et al. |
| 2017/0327602 A1 | 11/2017 | Ogasawara et al. |

FOREIGN PATENT DOCUMENTS

| CN | 101977974 B | 5/2014 |
| CN | 103797034 | 5/2014 |
| CN | 104105727 | 10/2014 |
| CN | 107074997 | 8/2017 |
| EP | 1240267 | 9/2002 |
| EP | 2703434 B1 | 9/2015 |
| EP | 3508532 | 7/2019 |
| JP | 06114867 B1 | 4/2017 |
| JP | 2017133066 | 8/2017 |
| WO | 03104337 | 12/2003 |
| WO | 2016101105 A1 | 6/2016 |

OTHER PUBLICATIONS

Fox, Bulletin of the American Phyical Society., 1956, p. 123, vol. 1, No. 3.

* cited by examiner

Primary Examiner — Kelechi C Egwim
(74) Attorney, Agent, or Firm — Karl E. Stauss; Cantor Colburn LLP

(57) ABSTRACT

An aqueous coating composition having good freeze-thaw stability and providing coatings with good stain resistance.

15 Claims, No Drawings

AQUEOUS COATING COMPOSITION

FIELD OF THE INVENTION

The present invention relates to a zero or low volatile organic compounds (VOCs) aqueous coating composition and a process of preparing the same.

INTRODUCTION

Aqueous or waterborne coating compositions are becoming increasingly more important than solvent-based coating compositions for less environmental problems. The coating industry is always interested in developing coating compositions without or with substantially reduced VOC content, for example, aqueous coating compositions comprising not greater than 5 grams (g) of VOCs per liter of coating compositions. However, aqueous coating compositions, particularly zero or low VOC paints and latex dispersions, usually suffer from a lack of freeze-thaw (F/T) stability, particularly during transportation and storage.

Addition of conventional anti-freeze agents to coating compositions can achieve F/T stability. Examples of these conventional anti-freeze agents include ethylene glycol (EG), propylene glycol (PG), diethylene glycol, and coalescents with low boiling point (<280° C.). However, the zero or low VOC requirement means the level of these glycol derivatives or low boiling point coalescents that can be used has to be reduced or eliminated. Recently developed anti-freeze agents having no contribution to the VOC content, such as polyethylene glycol (PEG) and tristyrylphenol ethoxylate, can be used to improve F/T stability of coating compositions. For example, European Patent No. 2,703,434 discloses the use of alkoxylated tristyrylphenols or alkoxylated tributylphenols for improving F/T stability of latex dispersions and paint formulations. Unfortunately, the addition of these compounds hurts stain resistance of the resulting coatings. Some high-end applications require coatings with good stain resistance as indicated by a total stain removal score of at least 65 so as to meet the requirement of national standards such as the GB/T9780-2013 standard.

Therefore, there is a need to develop an aqueous coating composition which meets the zero or low VOC requirement and provides an F/T stable coating composition while improving stain resistance of coatings obtained therefrom.

SUMMARY OF THE INVENTION

The present invention uses a novel combination of a specific emulsion polymer, a polyoxypropylene polyol having a number average molecular weight of from 350 to 3,500, a specific phosphate surfactant, and a functional silane selected from the group consisting of an epoxy functional silane compound and an epoxy functional polysiloxane oligomer. The aqueous coating composition of the present invention affords good F/T stability and provides coatings with surprisingly good stain resistance, as indicated by a total stain removal score of at least 65 as measured according to the GB/T 9780-2013 method, which is the test method for stain removal of films of architectural coatings and paints (issued date: Nov. 27, 2013; effective date: Aug. 1, 2014). In the meanwhile, the aqueous coating composition can achieve zero or low VOCs, that is, 5 g/L VOCs or less as measured by the GB18582-2008 standard, which is the national standard for indoor decorating and refurbishing materials-Limit of harmful substances of interior architectural coatings (issued date: Apr. 1, 2008; effective date: Oct. 1, 2008). The above two standards were both published by General Administration of Quality Supervision, Inspection and Quarantine, and Standardization Administration of the P. R. China.

In a first aspect, the present invention is an aqueous coating composition comprising:

(a) an emulsion polymer comprising, based on the weight of the emulsion polymer, from 25% to 63% by weight of structural units of a vinyl aromatic monomer, and structural units of a polymerizable surfactant having the structure of formula (I),

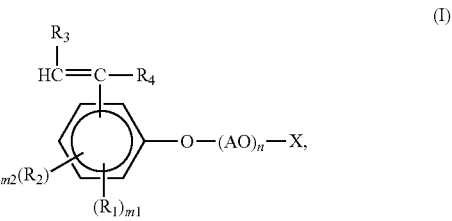

wherein $R_1$ is a phenyl group or a phenyl substituted alkyl group; m1 is 1, 2, 3 or 4; $R_2$ is an alkyl or a substituted alkyl; m2 is 0 or 1; $R_3$ is hydrogen or a $C_1$-$C_{20}$ alkyl group; $R_4$ is hydrogen or a $C_1$-$C_{20}$ alkyl group; A represents an alkylene group or a substituted alkylene group, having 2 to 4 carbon atoms; n is an integer in the range of from 1 to 100; and X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—CH($SO_3M$)-COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue;

(b) a polyoxypropylene polyol having a number average molecular weight of from 350 to 3,500;

(c) a phosphate surfactant having the structure of formula (III),

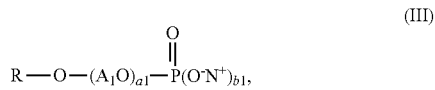

wherein R is a $C_8$-$C_{30}$ alkyl group, $A_1O$ is an alkoxylated group, a1 is an integer of from 1 to 30, b1 is 1 or 2, and $N^+$ is a metal ion or ammonium ion; and (d) a functional silane selected from an epoxy functional silane compound, an epoxy functional polysiloxane oligomer, and mixtures thereof.

In a second aspect, the present invention is a process of preparing the aqueous coating composition of the first aspect, by admixing the emulsion polymer, the polyoxypropylene polyol, the phosphate surfactant, and the functional silane.

DETAILED DESCRIPTION OF THE INVENTION

"Aqueous" composition or dispersion herein means that particles dispersed in an aqueous medium. By "aqueous medium" herein is meant water and from 0 to 30%, by weight based on the weight of the medium, of watermiscible compound(s) such as, for example, alcohols, glycols, glycol ethers, glycol esters, and the like.

"Acrylic" as used herein includes (meth)acrylic acid, (meth)alkyl acrylate, (meth)acrylamide, (meth)acrylonitrile and their modified forms such as (meth)hydroxyalkyl acrylate. Throughout this document, the word fragment "(meth) acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" as used herein can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(\text{calc.})} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

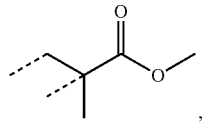

where the dotted lines represent the points of attachment of the structural unit to the polymer backbone.

The emulsion polymer useful in the present invention may comprise structural units of one or more vinyl aromatic monomers. The vinyl aromatic monomers may include styrene, substituted styrene including, for example, benzyl acrylate, 2-phenoxyethyl acrylate, butylstryene; methylstyrene; p-methoxystyrene; o-, m-, and p-methoxy-, o-, m-, and p-chloro-, o-, m-, and p-trifluoromethyl-, and m- and p-nitrostyrene; and mixtures thereof. Preferred vinyl aromatic monomer is styrene. The emulsion polymer may comprise, by weight based on the weight of the emulsion polymer, 25% or more, 28% or more, 30% or more, 32% or more, 34% or more, 35% or more, 38% or more, or even 40% or more, and at the same time, 63% or less, 62% or less, 60% or less, 59% or less, 58% or less, 55% or less, 50% or less, 48% or less, 45% or less, 44% or less, 43% or less, or even 42.5% or less, of structural units of the vinyl aromatic monomer. "Weight of the emulsion polymer" in the present invention refers to the dry or solids weight of the emulsion polymer.

The emulsion polymer useful in the present invention may further comprise structural units of one or more polymerizable surfactants. The polymerizable surfactants may have the structure of formula (I),

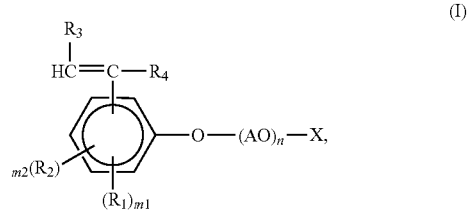

wherein $R_1$ is a phenyl group or a phenyl substituted alkyl group;

m1 is 1, 2, 3 or 4, preferably from 1 to 3;

$R_2$ is an alkyl group or a substituted alkyl group, preferably a $C_1$-$C_4$ alkyl or a substituted $C_1$-$C_4$ alkyl group;

m2 is 0 or 1, preferably 0;

$R_3$ is hydrogen or a $C_1$-$C_{20}$ or $C_1$-$C_4$ alkyl group such as methyl;

$R_4$ is hydrogen or a $C_1$-$C_{20}$ or $C_1$-$C_4$ alkyl group such as methyl;

A represents an alkylene group or a substituted alkylene group, having 2 to 4 carbon atoms, such as ethylene, propylene, and butylene; preferably, an ethylene group;

n represents an average addition mole number of alkylene oxide and can be an integer of 1 or higher, 2 or higher, 3 or higher, 4 or higher, or even 5 or higher, and at the same time, 100 or lower, 60 or lower, 50 or lower, 40 or lower, or even 20 or lower; preferably, from 5 to 20; and X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—$CH(SO_3M)$-COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue. Preferably, X represents —$SO_3M$. Preferred polymerizable surfactants have general formula (I), where A is an ethylene group and n is an integer ranging from 5 to 20.

Specific examples of the polymerizable surfactants have the structure of formula (II),

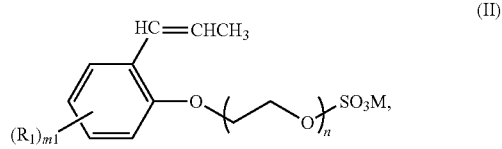

wherein $R_1$, m1, and n are as defined above in formula (I), and M is a counter ion such as $NH_4^+$, $Li^+$, $Na^+$ or $K^+$.

In formula (I) or (II), preferred $R_1$ is a phenyl substituted alkyl group having the structure of

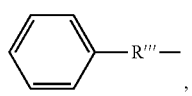

wherein R''' is an alkylene group having from 1 to 4 carbon atoms, preferably from 2 to 3 carbon atoms, such as for example,

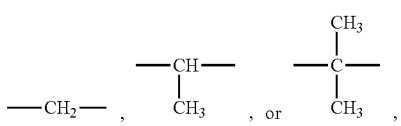

More preferably, m1 is 1, 2 or 3, n is an integer in the range of from 5 to 20, and $R_1$ is

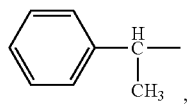

The emulsion polymer useful in the present invention may comprise, by weight based on the weight of the emulsion polymer, 0.1% or more, 0.2% or more, 0.25% or more, 0.3% or more, 0.4% or more, 0.5% or more, 0.6% or more, 0.7% or more, 0.8% or more, 0.9% or more, 1% or more, or even 1.1% or more, and at the same time, 3% or less, 2.8% or less, 2.5% or less, 2.4% or less, 2.2% or less, 2% or less, 1.8% or less, 1.6% or less, 1.5% or less, 1.4% or less, 1.3% or less, or even 1.2% or less, of structural units of the polymerizable surfactant.

The emulsion polymer useful in the present invention may further comprise structural units of one or more additional monoethylenically unsaturated nonionic monomers that are different from the vinyl aromatic monomer. "Nonionic monomers" herein refer to monomers that do not bear an ionic charge between pH=1-14. Examples of suitable additional monoethylenically unsaturated nonionic monomers include alkyl esters of (meth)acrylic acids, preferably, $C_1$-$C_{20}$, $C_2$-$C_{12}$ or $C_2$-$C_4$-alkyl esters of (meth)acrylic acid, for example, methyl acrylate, methyl methacrylate, ethyl acrylate, ethyl methacrylate, butyl acrylate, butyl methacrylate, 2-ethylhexyl acrylate, nonyl acrylate, decyl acrylate, lauryl acrylate, hydroxyethyl methacrylate, hydroxypropyl methacrylate, or combinations thereof; (meth)acrylonitrile; butadiene; and mixtures thereof. Preferred additional monoethylenically unsaturated nonionic monomers are selected from methyl acrylate, methyl methacrylate, ethyl acrylate, butyl acrylate, butyl methacrylate, 2-ethylhexyl acrylate and mixtures thereof. The emulsion polymer may comprise, by weight based on the weight of the emulsion polymer, from 33% to 75%, from 35% to 70%, from 40% to 65%, from 45% to 60%, or from 50% to 55%, of structural units of the additional monoethylenically unsaturated nonionic monomers.

The emulsion polymer useful in the present invention may also comprise structural units of one or more monoethylenically unsaturated monomers having one or more functional groups. The functional groups may be selected from a carboxyl, amide, sulfonate, acetoacetate, carbonyl, ureido, imide, amino, or phosphorous group, and combinations thereof. Sulfonate and phosphate groups herein in the ethylenically unsaturated monomers carrying at least one functional group may be in the salt form. Examples of such functional-group-containing monoethylenically unsaturated monomers include α, β-ethylenically unsaturated carboxylic acids including an acid-bearing monomer such as methacrylic acid, acrylic acid, itaconic acid, maleic acid, crotonic acid, acyloxypropionic acid, or fumaric acid; or a monomer bearing an acid-forming group which yields or is subsequently convertible to, such an acid group (such as anhydride, (meth)acrylic anhydride, or maleic anhydride); acrylamide, methacrylamide, N-methylacrylamide, N-ethylacrylamide, N-isopropylacrylamide, N-butylacrylamide, N-tertiary butylacrylamide, N-2-ethylhexylacrylamide, N,N-dimethylacrylamide, N,N-diethylacrylamide and diacetoneacrylamide; sulfonate monomers such as sodium styrene sulfonate (SSS) and sodium vinyl sulfonate (SVS), salts thereof; acrylamido-2-methylpropanesulfonic acid (AMPS), salts thereof; phosphoalkyl (meth)acrylates such as phosphoethyl (meth)acrylate, phosphopropyl (meth)acrylate, phosphobutyl (meth)acrylate, salts thereof; diacetone acrylamide (DAAM), acetoacetoxyethyl (meth)acrylate, acetoacetoxypropyl (meth)acrylate, acetoacetoxybutyl (meth)acrylate, 2,3-di(acetoacetoxy) propyl (meth)acrylate, allyl acetoacetates, or vinyl acetoacetates; and mixtures thereof. Preferred functional-group-containing monoethylenically unsaturated monomers are selected from the group consisting of acrylic acid, methyl acrylic acid, acrylamide and methylacrylamide. The emulsion polymer may comprise, by weight based on the weight of the emulsion polymer, from 0 to 5%, from 0.1% to 3%, from 0.3% to 2.5%, or from 0.5% to 2%, of structural units of the functional-group-containing monoethylenically unsaturated monomer.

The emulsion polymer useful in the present invention may also comprise structural units of one or more multiethylenically unsaturated monomers including di-, tri-, tetra-, or higher multifunctional ethylenically unsaturated monomers. Examples of suitable multiethylenically unsaturated monomers include butadiene, allyl(meth)acrylate, divinyl benzene, ethylene glycol dimethacrylate, butylene glycol dimethacrylate and mixtures thereof. The emulsion polymer may comprise, by weight based on the weight of the emulsion polymer, from 0 to 1% of structural units of the multiethylenically unsaturated monomer, for example, 0.6% or less, 0.2% or less, or even 0.1% or less.

The emulsion polymer useful in the present invention preferably comprises, by weight based on the weight of the emulsion polymer, from 30% to 55% of structural units of styrene; from 0.25% to 3% of structural units of the polymerizable surfactant; from 0.1% to 5% by weight of structural units of the functional-group-containing monoethylenically unsaturated monomer selected from the group consisting of the α, β-ethylenically unsaturated carboxylic acid, acrylamide and methacrylamide; from 0 to 1% of structural units of the multiethylenically unsaturated monomer; and the rest being the additional monoethylenically nonionic monomers.

The emulsion polymer useful in the present invention may have a Tg of from −25 to 28° C., −20 to 25° C., −15 to 20° C., −10 to 15° C., or −5 to 10° C.

The emulsion polymer useful in the present invention may be prepared by free-radical polymerization, such as suspension polymerization or emulsion polymerization, of the vinyl aromatic monomer, and other monomers described above in the presence of the polymerizable surfactant. Emulsion polymerization is a preferred process. Total weight concentration of the monomers and the polymerizable surfactant for preparing the emulsion polymer is equal to 100%. A mixture of the monomers and the polymerizable surfactant may be added neat or as an emulsion in water; or added in one or more additions or continuously, linearly or nonlinearly, over the reaction period of preparing the emulsion polymer. Temperature suitable for emulsion polymerization processes may be lower than 100° C., in the range of from 30° C. to 95° C., or in the range of from 50° C. to 90° C. Multistage free-radical polymerization using the monomers described above can be used, which at least two stages are formed sequentially, and usually results in the formation of the multistage polymer comprising at least two polymer compositions.

In the polymerization process of preparing the emulsion polymer, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of from 0.01% to 3.0% by weight, based on the total weight of monomers and the polymerizable surfactant. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process of preparing the emulsion polymer, one or more chain transfer agents may be used. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan and mixtures thereof. The chain transfer agent may be used in an effective amount to control the molecular weight of the emulsion polymer, for example, from 0 to 1%, from 0.1% to 0.7%, or from 0.2% to 0.5%, by weight based on the total weight of monomers and the polymerizable surfactant used for preparing the emulsion polymer.

After completing the polymerization of the emulsion polymer, the obtained aqueous polymer dispersion may be neutralized by one or more bases as neutralizers to a pH value, for example, at least 6, from 6 to 10, or from 7 to 9. The bases may lead to partial or complete neutralization of the ionic or latently ionic groups of the emulsion polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, aluminum hydroxide, and mixtures thereof. The aqueous polymer dispersion may be further subject to stream stripping to further reduce the VOC content of the emulsion polymer dispersion. Process for stream stripping polymer dispersions are known in the art such as those described in U.S. Pat. No. 8,211,987B2 and U.S. Pat. No. 7,745,567B2.

The aqueous coating composition of the present invention may further comprise one or more polyoxypropylene polyols, that is, poly(propylene oxide) homopolymers. The polyoxypropylene polyols may have a number average molecular weight ($M_n$) of 350 or more, 360 or more, 370 or more, 375 or more, 380 or more, 390 or more, 400 or more, 410 or more, 420 or more, 430 or more, 440 or more, or even 450 or more, and at the same time, 3,500 or less, 3,400 or less, 3,200 or less, 3,000 or less, 2,800 or less, 2,500 or less, 2,300 or less, 2,000 or less, 1,800 or less, 1,600 or less, 1,500 or less, 1,200 or less, 1,000 or less, 900 or less, 800 or less, 700 or less, 650 or less, 600 or less, 550 or less, or even 500 or less. $M_n$ herein may be measured by Gel Permeation Chromatography (GPC) or by calculation according to equation (i) below. For example, $M_n$ of the polyoxypropylene polyol can be measured by SEC on two Polymer Laboratories Mixed E columns (in tandem) with refractive index detector at 40° C. using polystyrene narrow standards. Molecular weights of polystyrene standards used for calibration range from 2329,000 to 580 g/mol. Peak molecular weight ($M_p$) used for calibration are values converted from peak molecular weight of each PS standard ("$M_{p\text{-}PS}$") according to the following equation: $M_p = 1.0951 * M_{p\text{-}PS}^{0.9369}$.

$M_n$ of the polyoxypropylene polyol can also be calculated by the equation (i) below, $$M_n = (\text{functionality of polyol} * 56100)/\text{hydroxy number of polyol} \tag{i}$$

wherein hydroxy number, reported in units of milligrams of KOH/gram of polyol, is measured according to the ASTM D4274-16 method (Standard Test Methods for Testing Polyurethane Raw Materials: Determination of Hydroxyl Numbers of Polyols).

Generally the polyoxypropylene polyol useful in the present invention may have an average hydroxy functionality of 2 or more or 3 or more, and at the same time, 6 or less, 5 or less, or even 4 or less.

The polyoxypropylene polyol useful in the present invention may be initiated with, for example, water, organic dicarboxylic acids such as succinic acid, adipic acid, phthalic acid, terephthalic acid; or polyhydric alcohols (such as dihydric to pentahydric alcohols or dialkylene glycols), for example, ethanediol, 1,2- and 1,3-propanediol, diethylene glycol, dipropylene glycol, 1,4-butanediol, 1,6-hexanediol, glycerol, trimethylolpropane, pentaerythritol, sorbitol, and sucrose or blends thereof; linear and cyclic amine compounds which may also contain a tertiary amine such as ethanoldiamine, triethanoldiamine, and various isomers of toluene diamine, methyldiphenylamine, aminoethylpiperazine, ethylenediamine, N-methyl-1,2-ethanediamine, N-methyl-1,3-propanediamine, N,N-dimethyl-1,3-diaminopropane, N,N-dimethylethanolamine, diethylene triamine, bis-3-aminopropyl methylamine, aniline, aminoethyl ethanolamine, 3,3-diamino-N-methylpropylamine, N,N-dimethyldipropylenetriamine, aminopropyl-imidazole and mixtures thereof; or combinations thereof. Suitable commercially available polyoxypropylene polyols may include, for example, VORANOL™ 2000 LM polyol, VORANOL CP450 polyol and VORANOL 3000LM polyol, all available from The Dow Chemical Company; and mixtures thereof (VORANOL is a trademark of The Dow Chemical Company).

The polyoxypropylene polyol useful in the present invention may be present, by weight based on the weight of the emulsion polymer, in an amount of 2% or more, 2.5% or more, 3% or more, 3.5% or more, 4% or more, 4.5% or more, 5% or more, 5.5% or even 6% or more, and at the same time, 20% or less, 18% or less, 16% or less, 15% or less, 14% or less, 13% or less, 12% or less, 10% or less, or even 8% or less.

The aqueous coating composition of the present invention may also comprise one or more phosphate surfactants having the structure of formula (III),

(III)

where R is a $C_8$-$C_{30}$ alkyl group, $A_1O$ is an alkoxylated group (i.e., alkylene oxide), a1 is an integer from 1 to 30, b1 is 1 or 2, and $N^+$ can be a metal ion or ammonium ion. R can be a $C_8$-$C_{25}$ alkyl, $C_8$-$C_{18}$ alkyl, $C_{10}$-$C_{15}$ alkyl, or $C_{11}$-$C_{13}$ alkyl group. $A_1O$ can be an ethoxylated group (i.e., ethylene oxide group, —$CH_2CH_2O$—), a propoxylated group (i.e., propylene oxide group), or combinations thereof, preferably an ethoxylated group. Preferably, the value of a1 ranges from 2 to 20, from 3 to 15, from 5 to 10, from 6 to 9, or from 6 to 8. Preferred b1 is 2. More preferably, a1 is an integer of from 3 to 15, b1 is 2, $A_1O$ is —$CH_2CH_2O$—, and $N^+$ is $NH_4^+$. Suitable commercially available phosphate surfactants may include RHODAFAC RS610 alkyl ethoxylated phosphate surfactant with six ethylene oxide units available from Solvay Company. The phosphate surfactant may be added in the polymerization process of preparing the emulsion polymer, e.g., prior to or during the polymerization of the monomers, after the polymerization, or combinations thereof.

The aqueous coating composition of the present invention may comprise, by weight based on the weight of the emulsion polymer, 0.3% or more, 0.4% or more, 0.5% or more, 0.8% or more, 1% or more, 1.2% or more, 1.5% or more, 1.8% or more, 2% or more, 2.2% or more, 2.5% or more, 2.8% or more, or even 3% or more, and at the same time, 10% or less, 9% or less, 8% or less, 7% or less, 6% or less, 5.5% or less, 5% or less, 4.5% or less, 4% or less, of the phosphate surfactant.

The aqueous coating composition of the present invention may further comprise one or functional silanes selected from epoxy functional polysiloxane oligomers, epoxy functional silane compounds and mixtures thereof. The epoxy functional polysiloxane oligomers useful in the present invention may have the structure of formula (IV):

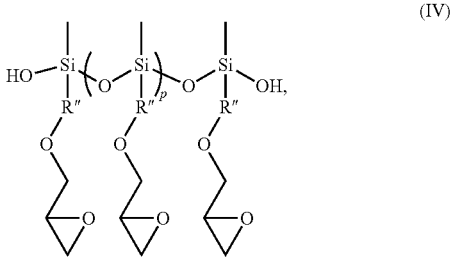

(IV)

where p is an integer of from 0 to 10, preferably, from 0 to 4, from 1 to 4, or from 1 to 3; and R" is —$CH_2CH_2CH_2$—.

The epoxy functional polysiloxane oligomer useful in the present invention can be a mixture of oligomers having the structure of formula (IV) with different p values, for example, 0, 1, 2 or 3. The epoxy functional polysiloxane oligomer may comprise, a polysiloxane of formula (IV), wherein p=0; a polysiloxane of formula (IV), wherein p=1; a polysiloxane of formula (IV), wherein p=2; and a polysiloxane of formula (IV), wherein p=3. Suitable commercially available epoxy-containing polysiloxane oligomers may include CoatOSil MP 200 silane available from Momentive Performance Materials Inc.

The epoxy functional silane compounds useful in the present invention are different from the epoxy functional polysiloxane oligomer, and are typically saturated alkoxylated silanes having an epoxy group. The epoxy functional silane compounds may have at least one hydrolysable silane group. A preferred epoxy functional silane compound has the structure of general formula (V):

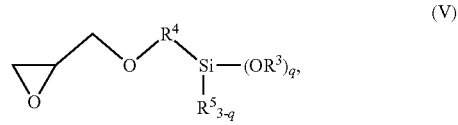

(V)

where $R^3$ represents an alkyl group having one to 6 carbon atoms; $OR^3$ group represents an alkoxy group including, for example, methoxy group, ethoxy group, and combinations thereof; $R^4$ represents a bivalent organic group having a molecular weight of 200 or less, preferably, $R^4$ is a $C_1$-$C_{10}$, $C_1$-$C_5$, or $C_1$-$C_3$ alkylene group; $R^5$ represents a hydrogen atom or an alkyl, aryl, or aralkyl group having 1 to 20 carbon atoms; and q is 1, 2 or 3. Examples of suitable epoxy functional silane compounds include gamma-glycidyloxypropyl trimethoxysilane, gamma-glycidyloxypropyl triethoxysilane, gamma-glycidyloxypropyl methyldiethoxysilane, gamma-glycidyloxypropyl methyldimethoxysilane and mixtures thereof. Suitable commercially available epoxy functional silane compounds may include SILQUEST A-187 gamma-glycidoxypropyltrimethoxysilane from Momentive Performance Materials Inc.

The functional silane useful in the present invention may be present in a combined amount of, by weight based on the weight of the emulsion polymer, 0.01% or more, 0.05% or more, 0.1% or more, 0.15% or more, 0.2% or more, 0.25% or more, 0.3% or more, 0.35% or more, or even 0.4% or more, and at the same time, 3% or less, 2.5% or less, 2% or less, 1.5% or less, 1% or less, 0.8% or less, or even 0.5% or less.

The aqueous coating composition of the present invention may comprise: the emulsion polymer comprising from 0.5% to 3% of structural units of the polymerizable surfactant, from 5% to 15% of the polyoxypropylene polyol, from 1% to 5% of the phosphate surfactant, and from 0.1% to 0.8% of the functional silane, by weight based on the weight of the emulsion polymer.

The aqueous coating composition of the present invention may comprise one or more additional anti-freeze agents that are different from the polyoxypropylene polyol described above and have no contribution to VOCs. Specific examples of additional anti-freeze agents include polyethylene glycol, RHODOLINE FT-100 F/T stabilizer available from Solvay and mixtures thereof. The additional anti-freeze agent, if present, should be in an amount without compromising stain resistance of coatings made therefrom, for example, less than 3%, less than 2%, or even less than 1%, by weight of the aqueous coating composition. Preferably, the aqueous coating composition is substantially free (e.g., includes less than 0.3%, preferably less than 0.1%, and more preferably zero) of the additional anti-freeze agents.

The aqueous coating composition of the present invention may further comprise pigments and/or extenders. "Pigment" herein refers to a particulate inorganic material which is capable of materially contributing to the opacity or hiding capability of a coating. Such materials typically have a refractive index greater than 1.8. Inorganic pigments typically include metal oxides. Examples of suitable metal oxides include titanium dioxide ($TiO_2$), zinc oxide, iron oxide, zinc sulfide, barium sulfate, barium carbonate and mixtures thereof. $TiO_2$ typically exists in two crystal forms, anastase and rutile. Suitable commercially available $TiO_2$ may include, for example, KRONOS 2310 available from Kronos Worldwide, Inc., Ti-Pure R-706 available from DuPont (Wilmington, Del.), TiONA AT1 available from Millenium Inorganic Chemicals, and mixtures thereof. $TiO_2$ may be also available in concentrated dispersion form. "Extender" herein refers to a particulate inorganic material having a refractive index of less than or equal to 1.8 and greater than 1.3. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), and mixtures thereof. The aqueous coating composition may have a pigment volume concentration (PVC) of from 30% to 65%, from 40% to 60%, or from 45% to 55%. PVC may be determined according to the following equation:

$$PVC = \frac{\text{Volume of Pigment and extender}}{\text{Dry volume of the coating composition}} \times 100\%$$

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates and mixtures thereof. Suitable commercially available defoamers may include, for example, TEGO Airex 902 W and TEGO Foamex 1488 polyether siloxane copolymer emulsions both available from TEGO, BYK-024 silicone deformer available from BYK, and mixtures thereof. The defoamer may be present, by weight based on the total weight of the aqueous coating composition, generally in an amount of from 0 to 1%, from 0.01% to 0.8%, or from 0.05% to 0.5%.

The aqueous coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is a hydrophobically-modified hydroxy ethyl cellulose (HMHEC). The thickener may be present, by weight based on the total weight of the aqueous coating composition, in an amount of from 0 to 5%, from 0.05% to 2%, or from 0.1% to 1%.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents may include, for example, SURFYNOL 104 nonionic wetting agent based on an actacetylenic diol available from Air Products, BYK-346 and BYK-349 polyether-modified siloxanes both available from BYK, or mixtures thereof. The wetting agent may be present, by weight based on the total weight of the aqueous coating composition, from 0 to 5%, from 0.01% to 2%, or from 0.2% to 1%.

The aqueous coating composition of the present invention may further comprise one or more coalescents with a high boiling point. "High boiling point" herein refers to a boiling point higher than 280° C. Examples of suitable coalescents include COASOL 290 Plus coalescent (a mixture of di-esters) available from Chemoxy International Ltd., OPTI-FILM Enhancer 400 coalescent available from Eastman, or mixtures thereof. The coalescents may be present, by weight based on the total weight of the aqueous coating composition, from 0 to 10%, from 0.01% to 9%, or from 1% to 8%.

The aqueous coating composition of the present invention may further comprise one or more dispersants. The dispersant can be polyacrylic acid or polymethacrylic acid or maleic anhydride with various monomers such as styrene, acrylate or methacrylate esters, diisobutylene, and other hydrophilic or hydrophobic comonomers; salts of thereof; and mixtures thereof. The dispersant may be present, by weight based on the total weight of the aqueous coating composition, in an amount of from 0 to 5%, from 0.1% to 4%, or from 0.3% to 3%.

In addition to the components described above, the aqueous coating composition of the present invention may further comprise any one or combination of the following additives: buffers, neutralizers, humectants, mildewcides, biocides, anti-skinning agents, colorants, flowing agents, anti-oxidants, plasticizers, leveling agents, adhesion promoters, and grind vehicles. When present, these additives may be present in a combined amount of from 0.001% to 10% or from 0.01% to 2%, by weight based on the total weight of the aqueous coating composition. The aqueous coating composition may comprise water in an amount of from 30% to 90%, from 40% to 80%, or from 50% to 70% by weight of the aqueous coating composition.

The aqueous coating composition of the present invention may be prepared by a process comprising: admixing the emulsion polymer, the phosphate surfactant, the polyoxypropylene polyol, the functional silane, and other optional components, e.g., pigments and/or extenders as described above. For example, the aqueous coating composition may be prepared by admixing a dispersion comprising the emulsion polymer and the functional silane with the phosphate surfactant and the polyoxypropylene polyol. Components in the aqueous coating composition may be mixed in any order to provide the aqueous coating composition of the present invention. Any of the above-mentioned optional components may also be added to the composition during or prior to the mixing to form the aqueous coating composition. The functional silane is preferably mixed with the emulsion polymer prior to mixing with other components in the aqueous coating composition. When the aqueous coating composition comprises pigment and/or extender, the pigments and/or extenders are preferably mixed with the dispersant to form a slurry of pigments and/or extender.

The aqueous coating composition of the present invention may comprise not greater than 5 grams of volatile organic compounds (VOCs) per liter (g/L) of the aqueous coating composition according to the GB 18582-2008 method, also known as "zero or low content of VOCs". Preferably, the VOC content of the aqueous coating composition is less than 3 g/L, less than 2.5 g/L, or even less than 2 g/L. Surprisingly, the aqueous coating composition even with zero or low content of VOCs can still have good freeze-thaw stability while achieving good stain resistance sufficient to meet the requirement of the GB/T9780-2013 standard. "Good stain resistance" represents a total stain removal score of 65 or higher, 66 or higher, 67 or higher, 68 or higher, 69 or higher, 70 or higher, 71 or higher, 72 or higher, or even 73 or higher, as measured by the GB/T9780-2013 standard. "Good freeze-thaw stability", that is, being freeze-thaw stable, means that a composition can be subjected to three freeze-thaw cycles showing no coagulation, according to the test method described in the Examples section below.

The present invention also relates to a process of using the aqueous coating composition of the present invention. The process may comprise: applying the coating composition to a substrate, and drying, or allowing to dry, the applied coating composition. The present invention also provides a method of preparing a coating. The method may comprise forming the aqueous coating composition of the present invention, applying the aqueous coating composition to a substrate, and drying, or allowing to dry, the applied coating composition to form the coating.

The aqueous coating composition of the present invention can be applied to, and adhered to, various substrates. Examples of suitable substrates include wood, metals, plastics, foams, stones, elastomeric substrates, glass, fabrics, concrete, or cementitious substrates. The aqueous coating composition, preferably comprising the pigment, is suitable for various applications such as marine and protective coatings, automotive coatings, traffic paint, Exterior Insulation and Finish Systems (EIFS), roof mastic, wood coatings, coil coatings, plastic coatings, powder coatings, can coatings, architectural coatings, and civil engineering coatings. The aqueous coating composition is particularly suitable for architectural coatings.

The aqueous coating composition of the present invention can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition of the present invention has been applied to a substrate, The aqueous coating composition can dry, or allow to dry, to form a film (this is, coating) at room temperature (20-25° C.), or at an elevated temperature, for example, from 35 to 60° C.

EXAMPLES

Some embodiments of the invention will now be described in the following Examples, wherein all parts and percentages are by weight unless otherwise specified. The following materials are used in the examples:

Styrene (ST), acrylic acid (AA), butyl acrylate (BA), acrylamide (AM), ethyl acrylate (EA), methyl methacrylate (MMA), methacrylic acid (MAA) and monoethanolamine (MEA) are all available from The Dow Chemical Company.

HITENOL AR-1025 ("AR-1025") (25% active), available from Dai-Ichi Kogyo Seiyaku Co. Ltd., is polyoxyethylene styrenated propenyl phenyl ether sulfate ammonium.

DISPONIL A-19 IS ("A-19") surfactant (19% active), available from Congnis, is sodium dodecyl (Linear) benzene sulfonate (SDBS).

DISPONIL Fes-32 ("Fes-32") (31% active), available from BASF, is a fatty alcohol ether sulfate.

POLYSTEP P-12A surfactant ("P-12A") (25% active), available from Stepan, is polyethylene glycol monotridecyl ether phosphate.

CoatOSil MP 200 silane ("MP200"), available from Momentive Performance Materials Inc., is an epoxy functional silane oligomer.

SILQUEST A-187 gamma-Glycidoxypropyltrimethoxysilane ("A-187") and SILQUEST A-171 vinyl trimethoxysilane ("A-171") and both available from Momentive Performance Materials Inc.

NATROSOL 250 HBR hydroxyethylcellulose, available from Ashland Aqualon Company, is used as a thickener.

TAMOL™ 731 A dispersant (a hydrophobic copolymer), TERGITOL™ 15-S-40 nonionic surfactant, AMP-95™ neutralizer (2-methyl-2-amino-propanol), ROPAQUE Ultra E opaque polymer, ACRYSOL™ RM-8W rheology modifier (a nonionic urethane type polymer), and ACRYSOL RM-2020 NPR rheology modifier (HEUR) are all available from The Dow Chemical Company (TAMOL, TERGITOL, AMP-95 and ACRYSOL are all trademarks of The Dow Chemical Company).

LOMON R-996 $TiO_2$ is available from Si Chuan Lomon Titanium Industry Co., Ltd.

CELITE 499SP diatomite is available from IRI new materials Co., Ltd.

DB-80 calcined kaolin is available from Inner Mongolia Super Building Material Technology Co., Ltd.

Talc AT-1, available from Liaoning Haicheng Liluoxue TALC Limited Company, is a hydrated magnesium silicate.

FOAMASTER NXZ defoamer is available from Cognis Co. Ltd.

COASOL 290 Plus coalescent is available from Chemoxy International Ltd.

The following polyols are all available from The Dow Chemical Company:

VARANOL CP450 polyol ("CP450 polyol") is a polyoxypropylene polyol having $M_n$ of about 450 and an average hydroxy functionality of 3.

VORANOL 2000LM polyol ("2000LM polyol") is a polyoxypropylene polyol having $M_n$ of about 2,000 and an average hydroxy functionality of 2.

VORANOL 3000LM polyol ("3000LM polyol") is a polyoxypropylene polyol having $M_n$ of about 3,000 and an average hydroxy functionality of 2.

VORANOL RN482 polyol ("RN482 polyol") is a polyoxypropylene polyol having $M_n$ of about 700 and an average hydroxy functionality of 6.

VORANOL 223-060LM polyol ("223-060LM polyol") is an ethylene oxide capped polyoxypropylene polyol having $M_n$ of about 2,000 and an average hydroxy functionality of 2.

VORANOL 4240 polyol ("4240 polyol") is an ethylene oxide capped polyoxypropylene polyol having $M_n$ of about 4,000 and an average hydroxy functionality of 2.

VORANOL 8000LM polyol ("8000LM polyol") is a polyoxypropylene polyol having $M_n$ of about 8,000 and an average hydroxy functionality of 2.

The following standard analytical equipment and methods are used in the Examples.

Freeze/Thaw (F/T) Stability

Containers were filled with 75% volume of a test coating composition. The containers were sealed and placed into a freezer at −6° C. for 16 hours, and then taken out from the freezer to allow to thaw at ambient conditions (about 25° C.) for 8 hours. The above steps complete one F/T cycle. The F/T cycles were continued until the sample coagulated or to a maximum of three cycles. After each cycle, the cycle number was recorded if coagulation or gel had been observed. After the completion of 3 cycles, the sample was shaken manually and the appearance of the sample was observed by the naked eye. If the sample does not coagulate or shows no grits separated from the sample after the F/T test, the sample is rated as "Pass" indicating good F/T stability. Otherwise, if the sample coagulates or has grits separated, the sample is rated as "Fail" indicating poor F/T stability.

Stain Removal Test

Stain removal ability was tested according to the GB/T 9780-2013 method. Test samples were casted on black vinyl scrub charts to form wet films (thickness: 120 μm) using a drawdown bar. The films on the resultant test panels were cured for 7 days at room temperature before stains were applied. Within test areas (25 mm width and 100 mm length on the test panels), six types of stains (vinegar, black tea, ink, water black, alcohol black, and Vaseline black) were applied on the films, respectively. Liquid stains were applied over gauze to prevent the stain from running off from the test areas. Stains stayed on the test panels for 2 hours before excess stain was wiped off with dry tissue. The test panels were then placed on a scrub tester under a 1.5 kg weight, with a scrubbing cycle of 37 scrubs per minute. After the test panels were scrubbed for 200 cycles, it was removed from the tester, rinsed under running water, and hung up for drying. Then the cleaned stain area was evaluated by measuring the change of reflection index (X) using the formula below, $$X = \frac{Y_1}{Y_0} \times 100$$

where $Y_1$ is reflection index after the stain removal test and $Y_0$ is reflection index before the stain removal test. $Y_1$ and $Y_0$ were tested by BYK spectro-guide instrument.

Based on the obtained reflection index value X, the stain removal score (Ri) for each stain, on a scale of 1 to 10, can be obtained from the below table,

| R | Vinegar | Black tea | Ink | Water black | Alcohol black | Vaseline black |
|---|---|---|---|---|---|---|
| 10 | 99 < X ≤ 100 | 98 < X ≤ 100 | 96 < X ≤ 100 | 96 < X ≤ 100 | 95 < X ≤ 100 | 99 < X ≤ 100 |
| 9 | 98 < X ≤ 99 | 95 < X ≤ 98 | 91 < X ≤ 96 | 91 < X ≤ 96 | 89 < X ≤ 95 | 98 < X ≤ 99 |
| 8 | 97 < X ≤ 98 | 91 < X ≤ 95 | 85 < X ≤ 91 | 85 < X ≤ 91 | 82 < X ≤ 89 | 97 < X ≤ 98 |
| 7 | 96 < X ≤ 97 | 86 < X ≤ 91 | 78 < X ≤ 85 | 78 < X ≤ 85 | 74 < X ≤ 82 | 96 < X ≤ 97 |
| 6 | 95 < X ≤ 96 | 80 < X ≤ 86 | 70 < X ≤ 78 | 70 < X ≤ 78 | 65 < X ≤ 74 | 95 < X ≤ 96 |
| 5 | 93 < X ≤ 95 | 73 < X ≤ 80 | 61 < X ≤ 70 | 61 < X ≤ 70 | 55 < X ≤ 65 | 93 < X ≤ 95 |
| 4 | 90 < X ≤ 93 | 65 < X ≤ 73 | 51 < X ≤ 61 | 51 < X ≤ 61 | 44 < X ≤ 55 | 90 < X ≤ 93 |
| 3 | 86 < X ≤ 90 | 56 < X ≤ 65 | 40 < X ≤ 51 | 40 < X ≤ 51 | 32 < X ≤ 44 | 86 < X ≤ 90 |
| 2 | 81 < X ≤ 86 | 46 < X ≤ 56 | 28 < X ≤ 40 | 28 < X ≤ 40 | 19 < X ≤ 32 | 81 < X ≤ 86 |
| 1 | X ≤ 81 | X ≤ 46 | X ≤ 28 | X ≤ 28 | X ≤ 19 | X ≤ 81 |

The total stain removal score (R') was then calculated according to the formula below, $$R' = \frac{\sum_{i=1}^{n=6} R_i}{n} \times 10$$

where Ri is the stain removal score for different stains and n is 6. The stain removal score of at least 65 points represents for acceptable or good stain resistance. Otherwise, the total stain removal score less than 65 points is not acceptable. The higher the total stain removal score, the better the stain resistance.

VOCs Measurement

VOCs of a coating composition were measured according to the GB18582-2008 method. Quantitative and qualitative analyses of VOCs' of a sample were performed on an Agilent 7890A Gas Chromatograph (GC), 5975C Mass Spectrometer (MS) with triple-axis detector.

An aliquot of 2 g (recorded accurately) homogenized sample was weighted into a 20 ml centrifuge vial, added with an internal standard (2-(2-ethoxyethoxy)-ethanol) and a VOC marker (hexanedioic acid, diethyl ester), and then the exact weight was recorded. The sample was mixed in a vortex centrifuge vial for 1 minute, followed by 5-minute standing, vortex mixing again for 1 minute, and then centrifuging at 4000 rpm for 20 minutes. The supernatant of the sample was taken out and filtered through a 0.45 μm syringe filter. The filtration was then injected into a GC-MS system (injection volume: 1 μL) with conditions as follows, Oven Program: Initial 45° C., held for 4 minutes, then at a rate of 8° C./min to 230° C., held for 10 min; Run Time: 37.125 min; Flow rate: 1 mL/min; Average Velocity: 36.4 cm/sec; Inlet: temperature: 250° C., Split ratio: 10:1; Column: HP-5MS 5% Phenyl Methyl Siloxane; Length×Diameter×Film thickness: 30 m×250 µm×1.0 µm; and MS detector parameters: Low Mass: 29.0, High Mass: 350.0, MS Source temperature: 230° C., MS Quad temperature: 150° C.

Synthesis of Polymer Emulsion 1

Monomer Emulsion (ME) was prepared by mixing 375.7 g of deionized (DI) water, 51.84 g of AR-1025, 645.74 g of ST, 840.81 g of BA, 9.08 g of AM, and 24.47 g of AA.

In a 5-liter, four necked round bottom flask equipped with a paddle stirrer, a thermometer, nitrogen inlet and a reflux condenser, 608.40 g of DI water was added and heated to 90° C. under nitrogen atmosphere with stirring. 12.11 g of AR-1025, 3.82 g of $Na_2CO_3$, and 58.5 g of ME seed were then added into the flask, quickly followed by 5.35 g of sodium persulfate dissolved in 19.5 g of DI water. Upon holding the batch for 1 minute with stirring, ME was added into the flask while co-feeding 5.35 g of sodium persulfate catalyst and 1.34 g of sodium bisulfite activator in 100 minutes. When the ME feed was completed, a catalyst/activator feed (1.53 g of tert-Butyl hydroperoxide/0.47 g of iso-ascorbic acid) was added, and then another catalyst/activator feed (8.03 g of tert-Butyl hydroperoxide/2.72 g of iso-ascorbic acid) was added to the flask in 40 minutes to chase the residual monomer separately. Then MEA solution was added to adjust the pH to 7.5-8.5. At last, 5.03 g of CoatOSil MP 200 silane was post added slowly. The obtained polymer emulsion had a measured particle size of about 150 nanometers (nm) and solids of about 50% (Fox Tg of the polymer: −4° C.).

Synthesis of Polymer Emulsion 2

Monomer Emulsion (ME) was prepared by mixing 375.7 g of DI water, 51.84 g of AR-1025, 527.45 g of ST, 960.10 g of BA, 9.08 g of AM, and 24.47 g of AA.

In a 5-liter, four necked round bottom flask equipped with a paddle stirrer, a thermometer, nitrogen inlet and a reflux condenser, 608.40 g of DI water was added and heated to 90° C. under nitrogen atmosphere with stirring. 12.11 g of AR-1025, 3.82 g of $Na_2CO_3$, and 58.5 g of ME seed were then added into the flask, quickly followed by 5.35 g of sodium persulfate dissolved in 19.5 g of DI water. Upon holding the batch for 1 minute with stirring, ME was added into the flask while co-feeding 5.35 g of sodium persulfate catalyst and 1.34 g of sodium bisulfite activator in 100 minutes. When the ME feed was completed, a catalyst/activator feed (1.53 g of tert-Butyl hydroperoxide/0.47 g of iso-ascorbic acid) was added, and then another catalyst/activator feed (8.03 g of tert-Butyl hydroperoxide/2.72 g of iso-ascorbic acid) was added to the flask in 40 minutes to chase the residual monomer separately. Then MEA solution was added to adjust the pH to 7.5-8.5. At last, 5.03 g of CoatOSil MP 200 silane was post added slowly. The obtained polymer emulsion had a measured particle size of about 150 nm and solids of about 50% (Fox Tg of the polymer: −14° C.).

Synthesis of Polymer Emulsion 3

Monomer Emulsion (ME) was prepared by mixing 375.7 g of DI water, 51.84 g of AR-1025, 659.91 g of MMA, 836.05 g of BA, and 23.06 g of MAA.

In a 5-liter, four necked round bottom flask equipped with a paddle stirrer, a thermometer, nitrogen inlet and a reflux condenser, 608.40 g of DI water was added and heated to 90° C. under nitrogen atmosphere with stirring. 12.11 g of AR-1025, 3.82 g of $Na_2CO_3$, and 58.5 g of ME seed were then added into the flask, quickly followed by 5.35 g of sodium persulfate dissolved in 19.5 g of DI water. Upon holding the batch for 1 minute with stirring, ME was added into the flask while co-feeding 5.35 g of sodium persulfate catalyst and 1.34 g of sodium bisulfite activator in 100 minutes. When the ME feed was completed, a catalyst/activator feed (1.53 g of tert-Butyl hydroperoxide/0.47 g of iso-ascorbic acid) was added, and then another catalyst/activator feed (8.03 g of tert-Butyl hydroperoxide/2.72 g of iso-ascorbic acid) was added to the flask in 40 minutes to chase the residual monomer separately. Then MEA solution was added to adjust the pH to 7.5-8.5. At last, 5.03 g of CoatOSil MP 200 silane was post added slowly. The obtained polymer emulsion had a measured particle size of about 150 nm and solids of about 50% (Fox Tg of the polymer: −4° C.).

Synthesis of Polymer Emulsion 4

Monomer Emulsion (ME) was prepared by mixing 375.7 g of DI water, 51.84 g of AR-1025, 983.45 g of ST, 503.63 g of BA, 9.08 g of AM, and 24.47 g of AA.

In a 5-liter, four necked round bottom flask equipped with a paddle stirrer, a thermometer, nitrogen inlet and a reflux condenser, 608.40 g of DI water was added and heated to 90° C. under nitrogen atmosphere with stirring. 12.11 g of AR-1025, 3.82 g of $Na_2CO_3$, and 58.5 g of ME seed were then added into the flask, quickly followed by 5.35 g of sodium persulfate dissolved in 19.5 g of DI water. Upon holding the batch for 1 minute with stirring, ME was added into the flask while co-feeding 5.35 g of sodium persulfate catalyst and 1.34 g of sodium bisulfite activator in 100 minutes. When the ME feed was completed, a catalyst/activator feed (1.53 g of tert-Butyl hydroperoxide/0.47 g of iso-ascorbic acid) was added, and then another catalyst/activator feed (8.03 g of tert-Butyl hydroperoxide/2.72 g of iso-ascorbic acid) was added to the flask in 40 minutes to chase the residual monomer separately. Then MEA solution was added to adjust the pH to 7.5-8.5. At last, 5.03 g of CoatOSil MP 200 silane was post added slowly. The obtained polymer emulsion had a measured particle size of about 150 nm and solids of about 50% (Fox Tg of the polymer: 30° C.).

Synthesis of Polymer Emulsion 5

Monomer Emulsion (ME) was prepared by mixing 375.7 g of DI water, 51.84 g of AR-1025, 642.06 g of ST, 840.81 g of BA, 9.08 g of AM, and 24.47 g of AA, 5.03 g of A-171.

In a 5-liter, four necked round bottom flask equipped with a paddle stirrer, a thermometer, nitrogen inlet and a reflux condenser, 608.40 g of DI water was added and heated to 90° C. under nitrogen atmosphere with stirring. 12.11 g of AR-1025, 3.82 g of $Na_2CO_3$, and 58.5 g of ME seed were then added into the flask, quickly followed by 5.35 g of sodium persulfate dissolved in 19.5 g of DI water. Upon holding the batch for 1 minute with stirring, ME was added into the flask while co-feeding 5.35 g of sodium persulfate catalyst and 1.34 g of sodium bisulfite activator in 100 minutes. When the ME feed was completed, a catalyst/activator feed (1.53 g of tert-Butyl hydroperoxide/0.47 g of iso-ascorbic acid) was added, and then another catalyst/activator feed (8.03 g of tert-Butyl hydroperoxide/2.72 g of iso-ascorbic acid) was added to the flask in 40 minutes to chase the residual monomer separately. Then MEA solution was added to adjust the pH to 7.5-8.5. The obtained polymer emulsion had a measured particle size of about 150 nm and solids of about 50% (Fox Tg of the polymer: −4° C.).

Synthesis of Polymer Emulsion 6

Monomer Emulsion (ME) was prepared by mixing 375.7 g of DI water, 51.84 g of AR-1025, 645.74 g of ST, 840.81 g of BA, 9.08 g of AM, and 24.47 g of AA.

In a 5-liter, four necked round bottom flask equipped with a paddle stirrer, a thermometer, nitrogen inlet and a reflux condenser, 608.40 g of DI water was added and heated to 90°

C. under nitrogen atmosphere with stirring. 12.11 g of AR-1025, 3.82 g of Na$_2$CO$_3$, and 58.5 g of ME seed were then added into the flask, quickly followed by 5.35 g of sodium persulfate dissolved in 19.5 g of DI water. Upon holding the batch for 1 minute with stirring, ME was added into the flask while co-feeding 5.35 g of sodium persulfate catalyst and 1.34 g of sodium bisulfite activator solution in 100 minutes. When the ME feed was completed, a catalyst/activator feed (1.53 g of tert-Butyl hydroperoxide/0.47 g of iso-ascorbic acid) was added, and then another catalyst/activator feed (8.03 g of tert-Butyl hydroperoxide/2.72 g of iso-ascorbic acid) was added to the flask in 40 minutes to chase the residual monomer separately. Then MEA solution was added to adjust the pH to 7.5-8.5. At last, 5.03 g of A-187 was post added slowly. The obtained polymer emulsion had a measured particle size of about 150 nm and solids of about 50% (Fox Tg of the polymer: −4° C.).

Synthesis of Polymer Emulsion 7

Monomer Emulsion (ME) was prepared by mixing 375.7 g of DI water, 68.21 g of A-19, 645.74 g of ST, 840.81 g of BA, 9.08 g of AM, and 24.47 g of AA.

In a 5-liter, four necked round bottom flask equipped with a paddle stirrer, a thermometer, nitrogen inlet and a reflux condenser, 608.40 g of DI water was added and heated to 90° C. under nitrogen atmosphere with stirring. 12.11 g of AR-1025, 3.82 g of Na$_2$CO$_3$, and 58.5 g of ME seed were then added into the flask, quickly followed by 5.35 g of sodium persulfate dissolved in 19.5 g of DI water. Upon holding the batch for 1 minute with stirring, ME was added into the flask while co-feeding 5.35 g of sodium persulfate catalyst and 1.34 g of sodium bisulfite activator in 100 minutes. When the ME feed was completed, a catalyst/activator feed (1.53 g of tert-Butyl hydroperoxide/0.47 g of iso-ascorbic acid) was added, and then another catalyst/activator feed (8.03 g of tert-Butyl hydroperoxide/2.72 g of iso-ascorbic acid) was added to the flask in 40 minutes to chase the residual monomer separately. Then MEA solution was added to adjust the pH to 7.5-8.5. At last, 5.03 g of CoatOSil MP 200 silane was post added slowly. The obtained polymer emulsion had a measured particle size of about 150 nm and solids of about 50% (Fox Tg of the polymer: −4° C.).

| Binder | Composition* |
|---|---|
| Polymer Emulsion 1 | 42ST/54.8BA/1.6AA/0.6AM/1AR-1025 (0.3MP200) |
| Polymer Emulsion 2 | 34.5ST/62.3BA/1.6AA/0.6AM/1AR-1025 (0.3MP200) |
| Polymer Emulsion 3 | 43MMA/54.5BA/1.5MAA/1AR-1025 (0.3MP200) |
| Polymer Emulsion 4 | 64ST/32.8BA/1.6AA/0.6AM/1AR-1025 (0.3MP200) |
| Polymer Emulsion 5 | 42ST/54.8BA/1.6AA/0.6AM/1AR-1025 (0.3A-171) |
| Polymer Emulsion 6 | 42ST/54.8BA/1.6AA/0.6AM/1AR-1025 (0.3A-187) |
| Polymer Emulsion 7 | 42.5ST/55.3BA/1.6AA/0.6AM (0.3MP200) |

*% by weight based on the dry weight of the polymer

The above obtained polymer emulsions were used to prepare coating compositions below, based on formulations given in Table 1. Types of polymer emulsions, and dosage and types of anti-freeze agents used in preparing the coating compositions are given in Table 2. The amount of water was adjusted to make up a total weight of each coating composition of 500 g.

Example (Ex) 1

The aqueous coating composition of Ex 1 was prepared by a two-stage process. First, components in the grind stage (including water (100 g), NATROSOL 250 HBR (1.00 g), TAMOL 731A (6.25 g), TERGITOL 15-S-40 (1.00 g), AMP-95 (0.06 g), R-996 (95.00 g), CELITE 499SP (12.50 g), DB-80 (60.00 g), Talc AT-1 (27.50 g) and water (2.00 g)) were mixed with a high-shear mixer. Sufficient agitation (usually 1,300-1,500 rpm) was required to obtain a homogeneous dispersion of pigment. After the grind stage, a viscous mill base was obtained. The viscous mill base was then mixed with components in the letdown stage (including Polymer Emulsion 1 (150 g), CP450 polyol (4.5 g), ROPAQUE Ultra E polymer (25.00 g), P12A surfactant (6.00 g), Foamaster NXZ (2.00 g), COASOL 290 Plus (2.10 g), ACRYSOL RM-8W (1.00 g), ACRYSOL RM-2020 NPR (2.50 g) and water (1.59 g)). At the same time, a high shear agitator was replaced with a low shear mixer (usually 500-700 rpm) to avoid foaming and unstable grits. After all the components in the letdown stage were added into the mill base and agitated for about 30 minutes, a homogeneous coating composition was obtained.

Ex 2

The coating composition of Ex 2 was prepared according to the same procedure as described above in Ex 1, except that CP450 polyol was replaced by RN482 polyol.

Ex 3

The coating composition of Ex 3 was prepared according to the same procedure as described above in Ex 1, except that the polymer emulsion 1 was replaced by the polymer emulsion 2.

Ex 4

The coating composition of Ex 4 was prepared according to the same procedure as described above in Ex 1, except that CP450 polyol was replaced by 2000LM polyol.

Ex 5

The coating composition of Ex 5 was prepared according to the same procedure as described above in Ex 1, except that CP450 polyol was replaced by 2000LM polyol and the amounts of 2000LM polyol and P12A surfactant, respectively, were doubled.

Ex 6

The coating composition of Ex 6 was prepared according to the same procedure as described above in Ex 1, except that CP450 polyol was replaced by 3000LM polyol.

Ex 7

The coating composition of Ex 7 was prepared according to the same procedure as described above in Ex 1, except that the polymer emulsion 1 was replaced by the polymer emulsion 6.

Comp (Comparative) Ex A

The coating composition of Comp Ex A was prepared according to the same procedure as described above in Ex 1, except that the polymer emulsion 1 was replaced by the polymer emulsion 7, CP450 polyol was replaced by ethylene glycol (EG), and P12A surfactant was removed.

Comp Ex B

The coating composition of Comp Ex B was prepared according to the same procedure as described above in Ex 1, except that the polymer emulsion 1 was replaced by the polymer emulsion 7, and CP450 polyol and P12A surfactant were both removed.

Comp Ex C

The coating composition of Comp Ex C was prepared according to the same procedure as described above in Ex 1, except that the polymer emulsion 1 was replaced by the polymer emulsion 7, and P12A surfactant was removed.

Comp Ex D

The coating composition of Comp Ex D was prepared according to the same procedure as described above in Ex 1, except that the polymer emulsion 1 was replaced by the polymer emulsion 7 and CP450 polyol was removed.

Comp Ex E

The coating composition of Comp Ex E was prepared according to the same procedure as described above in Ex 1, except that the polymer emulsion 1 was replaced by the polymer emulsion 7.

Comp Ex F

The coating composition of Comp Ex F was prepared according to the same procedure as described above in Ex 1, except that CP450 polyol and P12A surfactant were removed.

Comp Ex G

The coating composition of Comp Ex G was prepared according to the same procedure as described above in Ex 1, except that the post-added P12A surfactant was removed.

Comp Ex H

The coating composition of Comp Ex H was prepared according to the same procedure as described above in Ex 1, except that CP450 polyol was removed.

Comp Ex I

The coating composition of Comp Ex I was prepared according to the same procedure as described above in Ex 1, except that P12A surfactant was replaced by 15-s-40 surfactant.

Comp Ex J

The coating composition of Comp Ex J was prepared according to the same procedure as described above in Ex 1, except that P12A surfactant was replaced by Fes-32 surfactant.

Comp Ex K

The coating composition of Comp Ex K was prepared according to the same procedure as described above in Ex 1, except that P12A surfactant was replaced by A-19 surfactant.

Comp Ex L

The coating composition of Comp Ex L was prepared according to the same procedure as described above in Ex 1, except that CP450 polyol was replaced by 8000LM polyol.

Comp Ex M

The coating composition of Comp Ex M was prepared according to the same procedure as described above in Ex 1, except that the polymer emulsion 1 was replaced by the polymer emulsion 3, and CP450 polyol and P12A surfactant were both removed.

Comp Ex N

The coating composition of Comp Ex N was prepared according to the same procedure as described above in Ex 1, except that the polymer emulsion 1 was replaced by the polymer emulsion 3.

Comp Ex O

The coating composition of Comp Ex O was prepared according to the same procedure as described above in Ex 1, except that the polymer emulsion 1 was replaced by the polymer emulsion 4.

Comp Ex P

The coating composition of Comp Ex P was prepared according to the same procedure as described above in Ex 1, except that CP450 polyol was replaced by 4240 polyol.

Comp Ex Q

The coating composition of Comp Ex Q was prepared according to the same procedure as described above in Ex 1, except that CP450 polyol was replaced by 223-060LM polyol.

Comp Ex R

The coating composition of Comp Ex R was prepared according to the same procedure as described above in Ex 1, except that the polymer emulsion 1 was replaced by the polymer emulsion 5.

Table 1 gives properties of the above prepared coating compositions and coatings made therefrom. As shown in Table 1, the coating composition comprising 3% EG had a high VOC content (Comp Ex A). The coating compositions comprising the polymer emulsions prepared in the presence of A-19 surfactant all failed the F/T stability tests (Comp Exs B, C, D and E). The coating composition of Comp Ex F that didn't comprise a polyol or P-12A surfactant provided poor F/T stability and unsatisfactory stain resistance. Even addition of P-12A surfactant to Comp Ex F, the resultant coating composition of Comp Ex H still showed poor F/T stability. The coating composition of Comp Ex G comprising the combination of MP200 silane, CP450 polyol and the polymer emulsion 1 while containing no P-12A surfactant had no benefit on the stain resistance of the resultant coatings. The coating compositions comprising the polymer emulsion 1 in combination with 15-S-40 (Comp Ex I), Fes-32 (Comp Ex J), or A-19 (Comp Ex K) surfactants all showed no benefit on stain resistance of the resultant coatings. The coating composition of Comp Ex O also showed poor stain resistance. Coating compositions comprising a high molecular weight 8000LM polyol (Comp Ex L) or EO-PO polyols (Comp Exs P and Q) all showed poor stain resistance. The coating composition of Comp Ex R comprising the polymer emulsion prepared in the presence of A-171 polymerizable silane failed the F/T stability test. No synergetic effect was shown for coating compositions comprising pure acrylic binders (Comp Exs M and N) or styrene-acrylic binders comprising more than 64% of structural units of styrene (Comp Ex O).

The coating compositions of Exs 1-7 all had a VOC of less than 2 g/L. Surprisingly, these coating compositions comprising emulsion polymers prepared in the presence of AR1025 reactive surfactant, in combination with P-12A phosphate surfactant, the polypropylene polyols (CP450, RN482, 2000LM, or 3000LM polyol), and the non-polymerizable silanes (e.g., A-187 or MP200 functional silane) (Exs 1-7) all showed synergetic effects in improving F/T stability and increasing stain resistance scores in zero addition coating compositions. In summary, the coating compositions of Exs 1-7 all passed the F/T stability tests and provided coatings with good stain resistance sufficient to meet the requirement of GB/T9780-2013 (including, for example, stain resistance score of 65 or higher).

TABLE 1

Properties of Coatings

| | Polymer Emulsion | Polyol* | Post-added surfactant* | Silane* | Total stain removal score | F/T test | VOC, g/L |
|---|---|---|---|---|---|---|---|
| Ex 1 | Polymer Emulsion 1 | 3% CP450 polyol | 1% Pl2A | 0.3% MP200 | 70 | Pass | <2 |
| Ex 2 | Polymer Emulsion 1 | 3% RN482 polyol | 1% Pl2A | 0.3% MP200 | 68 | Pass | <2 |
| Ex 3 | Polymer Emulsion 2 | 3% CP450 polyol | 1% Pl2A | 0.3% MP200 | 70 | Pass | <2 |
| Ex 4 | Polymer Emulsion 1 | 3% 2000LM polyol | 1% P12A | 0.3% MP200 | 65 | Pass | <2 |
| Ex 5 | Polymer Emulsion 1 | 6% 2000LM polyol | 2% P12A | 0.3% MP200 | 73 | Pass | <2 |
| Ex 6 | Polymer Emulsion 1 | 3% 3000LM polyol | 1% Pl2A | 0.3% MP200 | 65 | Pass | <2 |
| Ex 7 | Polymer Emulsion 6 | 3% CP450 polyol | 1% Pl2A | 0.3% A-187 | 68 | Pass | <2 |
| Comp Ex A | Polymer Emulsion 7 | 3% EG | — | 0.3% MP200 | 65 | Pass | >5 |
| Comp Ex B | Polymer Emulsion 7 | — | — | 0.3% MP200 | 65 | Fail | <2 |
| Comp Ex C | Polymer Emulsion 7 | 3% CP450 polyol | — | 0.3% MP200 | 57 | Fail | <2 |
| Comp Ex D | Polymer Emulsion 7 | — | 1% Pl2A | 0.3% MP200 | 68 | Fail | <2 |
| Comp Ex E | Polymer Emulsion 7 | 3% CP450 polyol | 1% Pl2A | 0.3% MP200 | 62 | Fail | <2 |
| Comp Ex F | Polymer Emulsion 1 | — | — | 0.3% MP200 | 63 | Fail | <2 |
| Comp Ex G | Polymer Emulsion 1 | 3% CP450 polyol | — | 0.3% MP200 | 63 | Pass | <2 |
| Comp Ex H | Polymer Emulsion 1 | — | 1% Pl2A | 0.3% MP200 | 67 | Fail | <2 |
| Comp Ex I | Polymer Emulsion 1 | 3% CP450 polyol | 1% 15-s-40 | 0.3% MP200 | 63 | Pass | <2 |
| Comp Ex J | Polymer Emulsion 1 | 3% CP450 polyol | 1% Fes-32 | 0.3% MP200 | 50 | Pass | <2 |
| Comp Ex K | Polymer Emulsion 1 | 3% CP450 polyol | 1% A-19 | 0.3% MP200 | 63 | Fail | <2 |
| Comp Ex L | Polymer Emulsion 1 | 3% 8000LM polyol | 1% Pl2A | 0.3% MP200 | 60 | Pass | <2 |
| Comp Ex M | Polymer Emulsion 3 | — | — | 0.3% MP200 | 57 | Fail | <2 |
| Comp Ex N | Polymer Emulsion 3 | 3% CP450 polyol | 1% P-12A | 0.3% MP200 | 57 | Pass | <2 |
| Comp Ex O | Polymer Emulsion 4 | 3% CP450 polyol | 1% P-12A | 0.3% MP200 | 0 (broken) | Pass | <2 |
| Comp Ex P | Polymer Emulsion 1 | 3% 4240 polyol | 1% P-12A | 0.3% MP200 | 60 | Pass | <2 |
| Comp Ex Q | Polymer Emulsion 1 | 3% 223-060LM polyol | 1% P-12A | 0.3% MP200 | 63 | Pass | <2 |
| Comp Ex R | Polymer Emulsion 5 | 3% CP450 polyol | 1% P-12A | 0.3% A-171 | 70 | Fail | <2 |

*by weight based on the dry weight of the polymer in the polymer emulsion.

What is claimed is:

1. An aqueous coating composition, comprising:
(a) an emulsion polymer comprising, based on the weight of the emulsion polymer, from 25% to 63% by weight of structural units of a vinyl aromatic monomer, and structural units of a polymerizable surfactant having the structure of formula (I),

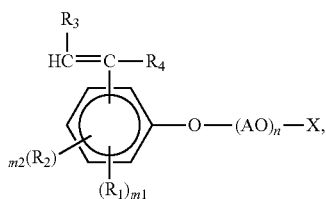

wherein $R_1$ is a phenyl group or a phenyl substituted alkyl group; m1 is 1, 2, 3 or 4; $R_2$ is an alkyl or a substituted alkyl; m2 is 0 or 1; $R_3$ is hydrogen or a $C_1$-$C_{20}$ alkyl group; $R_4$ is hydrogen or a $C_1$-$C_{20}$ alkyl group; A represents an alkylene group or a substituted alkylene group, having 2 to 4 carbon atoms; n is an integer in the range of from 1 to 100; and X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—$CH(SO_3M)$-COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue;
(b) a polyoxypropylene polyol having a number average molecular weight of from 350 to 3500;
(c) a phosphate surfactant having the structure of formula (III),

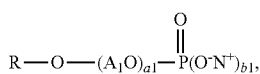

wherein R is a $C_8$-$C_{30}$ alkyl group, $A_1O$ is an alkoxylated group, a1 is an integer of from 1 to 30, b1 is 1 or 2, and $N^+$ is a metal ion or ammonium ion; and
(d) a functional silane selected from an epoxy functional silane compound, an epoxy functional polysiloxane oligomer, and mixtures thereof.

2. The aqueous coating composition of claim 1, wherein, in formula (I), m1 is 1, 2, or 3; and $R_1$ is

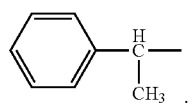

3. The aqueous coating composition of claim 1, wherein, in formula (I), A represents an ethylene group and n is an integer in the range of from 5 to 20.

4. The aqueous coating composition of claim 1, wherein the polyoxypropylene polyol is present in an amount of from 2% to 20% by weight, based on the weight of the emulsion polymer.

5. The aqueous coating composition of claim 1, wherein the polyoxypropylene polyol has a number average molecular weight of from 400 to 3000.

6. The aqueous coating composition of claim 1, wherein the emulsion polymer has a glass transition temperature of from −25 to 28° C.

7. The aqueous coating composition of claim 1, wherein the emulsion polymer comprises, based on the weight of the emulsion polymer, from 0.5% to 3% by weight of structural units of the polymerizable surfactant.

8. The aqueous coating composition of claim 1, wherein, in formula (III), a1 is an integer of from 3 to 15, b1 is 2, $A_1O$ is —$CH_2CH_2O$—, and $N^+$ is $NH_4^+$.

9. The aqueous coating composition of claim 1, wherein the phosphate surfactant is present in an amount of from 0.3% to 10% by weight, based on the weight of the emulsion polymer.

10. The aqueous coating composition of claim 1, wherein the vinyl aromatic monomer is styrene.

11. The aqueous coating composition of claim 1, wherein the epoxy functional polysiloxane oligomer has the structure of formula (IV),

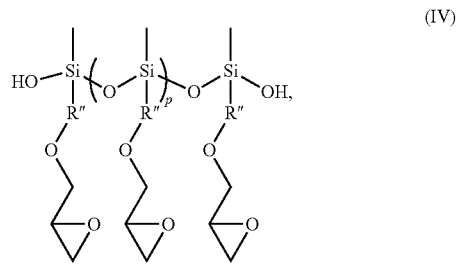

wherein R" is —$CH_2CH_2CH_2$— and p is an integer of from 0 to 10.

12. The aqueous coating composition of claim 1, wherein the epoxy functional silane compound is selected from the group consisting of gamma-glycidoxypropyltrimethoxysilane, gamma-glycidyloxypropyl triethoxysilane, gamma-glycidyloxypropyl methyldiethoxysilane, and gamma-glycidyloxypropyl methyldimethoxysilane.

13. The aqueous coating composition of claim 1, wherein the functional silane is present, based on the weight of the emulsion polymer, in a combined amount of from 0.01% to 3% by weight.

14. The aqueous coating composition of claim 1, comprising, by weight based on the weight of the emulsion polymer, the emulsion polymer comprising from 0.5% to 3% of structural units of the polymerizable surfactant; from 5% to 15% of the polyoxypropylene polyol; from 1% to 5% of the phosphate surfactant; and from 0.1% to 0.8% of the functional silane.

15. A process of preparing an aqueous coating composition, comprising admixing
(a) an emulsion polymer comprising, based on the weight of the emulsion polymer, from 25% to 63% by weight of structural units of a vinyl aromatic monomer, and structural units of a polymerizable surfactant having the structure of formula (I),

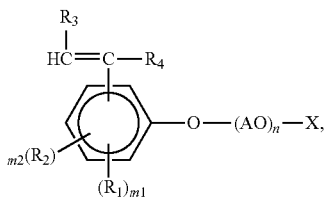 (I)

wherein $R_1$ is a phenyl group or a phenyl substituted alkyl group; m1 is 1, 2, 3 or 4; $R_2$ is an alkyl or a substituted alkyl; m2 is 0 or 1; $R_3$ is hydrogen or a $C_1$-$C_{20}$ alkyl group; $R_4$ is hydrogen or a $C_1$-$C_{20}$ alkyl group; A represents an alkylene group or a substituted alkylene group, having 2 to 4 carbon atoms; n is an integer in the range of from 1 to 100; and X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—$CH(SO_3M)$-COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue;

(b) a polyoxypropylene polyol having a number average molecular weight of from 350 to 3500;

(c) a phosphate surfactant having the structure of formula (III),

 (III)

wherein R is a $C_8$-$C_{30}$ alkyl group, $A_1O$ is an alkoxylated group, a1 is an integer of from 1 to 30, b1 is 1 or 2, and $N^+$ is a metal ion or ammonium ion; and (d) a functional silane selected from an epoxy functional silane compound, an epoxy functional polysiloxane oligomer, and mixtures thereof.

* * * * *